United States Patent [19]

Kugo et al.

[11] Patent Number: 4,708,440
[45] Date of Patent: Nov. 24, 1987

[54] LIQUID CRYSTAL DISPLAY DEVICE

[75] Inventors: Masaru Kugo, Ibaraki; Hideyuki Ouchi, Yokohama; Kouzou Katogi; Osamu Igarashi, both of Katsuta; Seiji Suda, Mito; Keiichi Tokuyama, Katsuta; Hirohisa Yamamura, Hitachioota, all of Japan

[73] Assignee: Hitachi, Ltd., Tokyo, Japan

[21] Appl. No.: 829,821

[22] Filed: Feb. 18, 1986

[30] Foreign Application Priority Data

Feb. 15, 1985 [JP] Japan ................................. 60-26271
Mar. 22, 1985 [JP] Japan ................................. 60-55918

[51] Int. Cl.⁴ .............................................. G02F 1/13
[52] U.S. Cl. ................................ 350/339 F; 350/339 D
[58] Field of Search ............... 350/338, 339 F, 339 D, 350/345

[56] References Cited

U.S. PATENT DOCUMENTS

| | | | |
|---|---|---|---|
| 4,042,294 | 8/1977 | Billings et al. | 350/338 X |
| 4,196,973 | 4/1980 | Hochstrate | 350/345 |
| 4,410,887 | 10/1983 | Stolov et al. | 350/339 F |
| 4,470,666 | 9/1984 | Eick | 350/339 F |
| 4,516,834 | 5/1985 | Cascini | 350/339 D X |
| 4,519,679 | 5/1985 | Horikiri et al. | 350/339 F |
| 4,630,894 | 12/1986 | Cremers | 350/339 F X |

FOREIGN PATENT DOCUMENTS

| | | |
|---|---|---|
| 0121305 | 10/1984 | European Pat. Off. . |
| 2415202 | 10/1974 | Fed. Rep. of Germany . |
| 3402469 | 7/1984 | Fed. Rep. of Germany . |
| 3313804 | 7/1984 | Fed. Rep. of Germany . |

*Primary Examiner*—Stanley D. Miller
*Assistant Examiner*—David Lewis
*Attorney, Agent, or Firm*—Antonelli, Terry & Wands

[57] ABSTRACT

In a segment display type multi-color liquid crystal display device, the area of the display surface of the display device except the areas of segment electrodes is formed so as to present a color identical or similar to a color presented by the segment electrodes in an unselected state. Selected segments can be clearly recognized.

5 Claims, 27 Drawing Figures

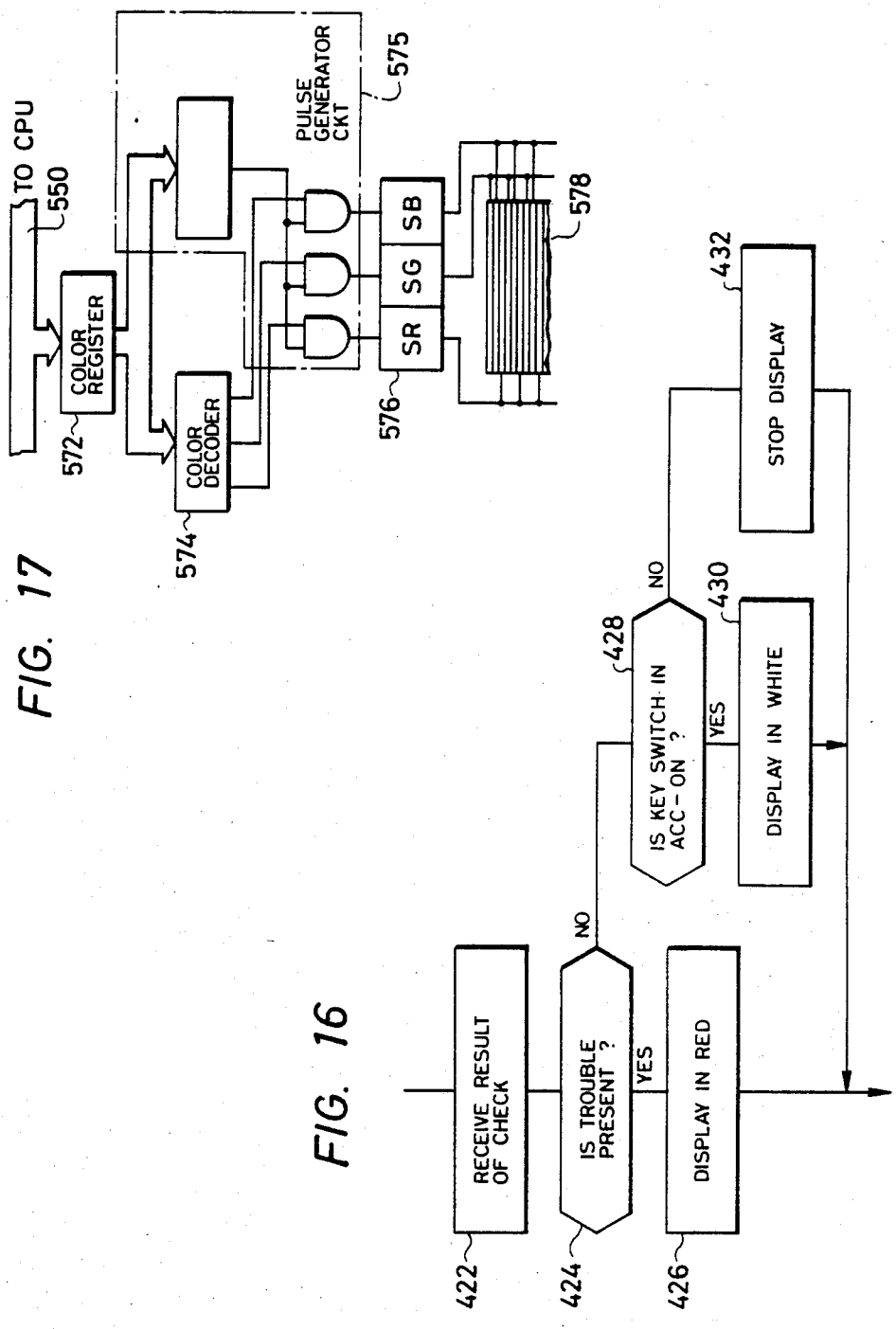

LIQUID CRYSTAL DISPLAY DEVICE

BACKGROUND OF THE INVENTION

The present invention relates to a liquid crystal display device, and more particularly to a variable color type liquid crystal display device which is well suited for performing multi-color display through the provision of color filters.

As a liquid crystal display device performing multi-color display, there has heretofore been known a device which performs dot type color display as described in the official gazette of Japanese Patent Application Laid-open No. 59-10988 by way of example. This liquid crystal display device performs the color display in such a way that thin-film transistors are formed on a liquid crystal substrate as semiconductor driver elements, on which color filters in the socalled RGB three primary colors of red, green and blue are formed. Accordingly, the prior-art liquid crystal display device involves a complicated manufacturing process and requires a manufacturing equipment equivalent to that of a semiconductor device, with the result that a steep rise in the cost of production is incurred.

For such reasons, a liquid crystal display device has been proposed which includes stripe-shaped transparent electrodes and is formed with color filters on the transparent electrodes so as to perform multi-color liquid crystal display with a simple segment formation. The liquid crystal display device of this type is described in, for example, the official gazette of Japanese Patent Application Laid-open No. 56-21182. It has the advantage that the manufacture is simplified. However, even when a segment constituting a pattern to be displayed is in the unselected state, it is sometimes seen as if it was selected, so that the display device is problematic in the points of visual verification and contrast. Another problem is that the outward appearance is poor.

SUMMARY OF THE INVENTION

The present invention has been made in view of the actual circumstances of the prior arts described above, and has for its object to provide a liquid crystal display device which is excellent in visual verification and contrast and which can present a good appearance.

In order to accomplish the object, according to the present invention, transparent electrodes and color filters are formed in the shape of stripes, and the color scheme of an unselected segment and that of a region other than a pattern and around the pattern are set at the same system.

Since the liquid crystal display device of the present invention is constructed as described above, the visual verification as well as the contrast enhanced and a fine appearance can be ensured, and these are effective to contribute to put into practical use the formation of the transparent electrodes and the color filters in the shape of stripes.

BRIEF DESCRIPTION OF THE DRAWINGS

In the accompanying drawings;

FIGS. 1-4 are explanatory views showing an embodiment of a liquid crystal display device according to the present invention, in which FIG. 1 is a perspective view showing the general setup, FIG. 2 is an explanatory view exemplifying the display content of a liquid crystal cell complised in this embodiment, FIG. 3 is a sectional view of essential portions showing the construction of the liquid crystal cell, and FIG. 4 is a front view showing a diffuser comprised in this embodiment;

FIG. 16 is a flow chart showing the subroutine of check processing;

FIG. 17 is a detailed diagram of a portion concerning trouble display in the system of FIG. 10;

DETAILED DESCRIPTION OF THE PREFERRED EMBODIMENTS

Figure 1:
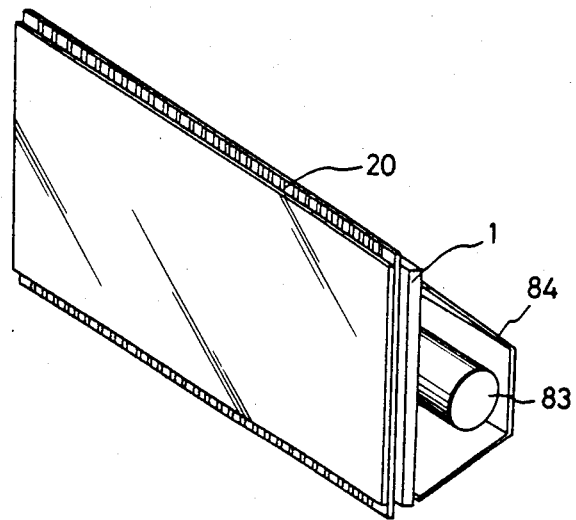
Figure 2:
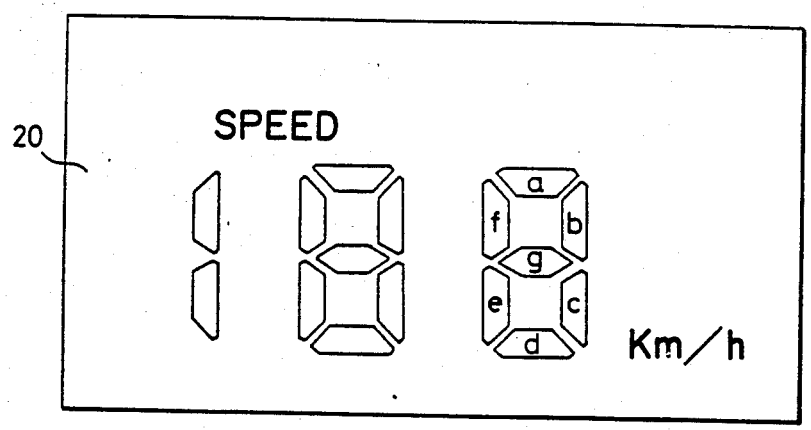
Figure 3:
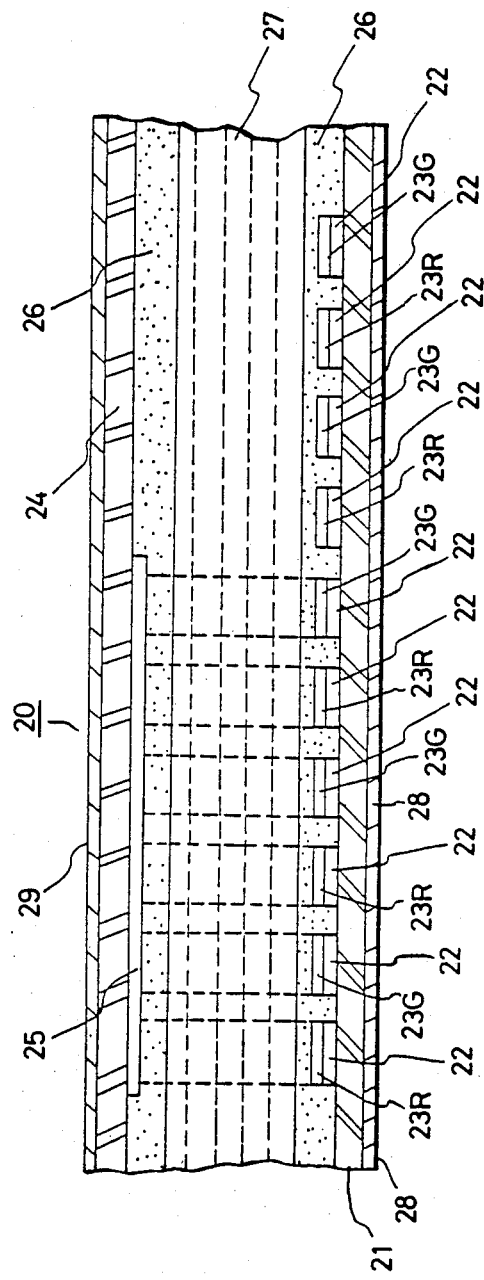
Figure 4:
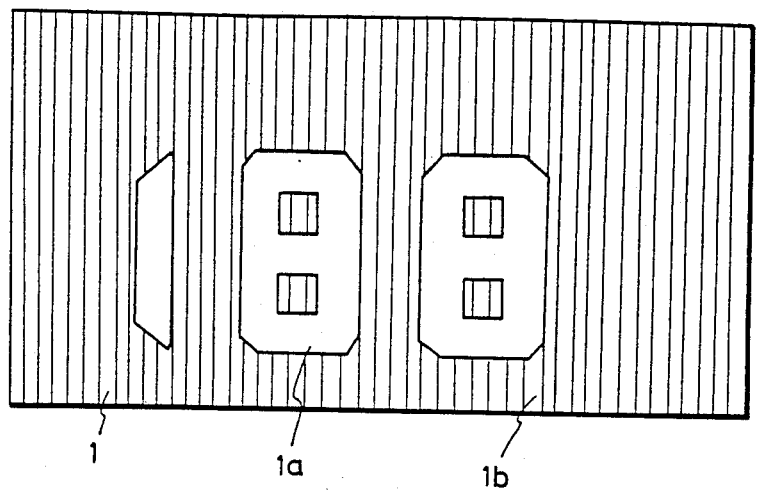

Now, the liquid crystal display device of the present invention will be described with reference to the drawings. FIGS. 1-4 are explanatory views showing an embodiment of the present invention, in which FIG. 1 is a perspective view showing the general setup, FIG. 2 is an explanatory view exemplifying the display content of a liquid crystal cell comprised in this embodiment, FIG. 3 is a sectional view of essential portions showing the construction of the liquid crystal cell, and FIG. 4 is a front view showing a diffuser comprised in this embodiment.

In FIG. 1, numeral 20 designates a liquid crystal cell to be described later, numeral 1 a diffuser to be described later, which is arranged behind the liquid crystal cell 20, numeral 83 a lamp for illuminating the diffuser 1 as well as the liquid crystal cell 20, and numeral 84 a reflector which is arranged surrounding the lamp 83 so as to effectively utilize the light of this lamp 83.

FIG. 2 shows an example of the display content of the above liquid crystal cell 20, and the example is the digital display of the speedometer of a vehicle. Numeral "8" is formed of seven segments, which are tentatively named a, b, c, d, e, f and g. The Arabic FIGS. 0–9 are expressed by the combinations of these segments.

The liquid crystal cell 20 is constructed as shown in FIG. 3 by way of example. Transparent electrodes 22 are disposed on a lower glass substrate 21, and color filters of, e.g., red and green 23R and 23G are alternately printed and formed on the transparent electrodes 22. On the other hand, a transparent electrode 25 is disposed on an upper glass substrate 24 which is arraged in opposition to the lower glass substrate 21. Aligning layers 26 for aligning liquid crystal molecules in a certain fixed direction are respectively disposed on the transparent electrodes 22 and 25, and the interspace between the aligning layers 26 is filled with a liquid crystal material 27. A lower polarizing plate 28 is stuck outside the lower glass substrate 21, and an upper polarizing plate 29 is similarly stuck outside the upper glass substrate 24.

In this liquid crystal cell 20, when a rectangular wave voltage is applied across the transparent electrodes 22 and 25, the liquid crystal material 27 between these transparent electrodes 22 and 25 operate, and the respective colors of red and green in which the color filters 23R and 23G are printed are transmittedly seen. That is, the single color, green or red or the color between them, yellow can be presented by selecting the transparent electrodes 22 formed on the lower glass substrate 21.

Regarding the diffuser 1 arranged behind the liquid crystal cell 20 shown in FIG. 1, the area 1a of each numeral portion to be illuminated through the color filter or filters 23R or/and 23G is rendered colorless as illustrated in FIG. 4 and light is transmitted therethrough. The other area 1b is set at a color scheme of the same system as that of the color scheme of the unselected segments of the liquid crystal cell 20, and light is transmitted therethrough.

Figure 5:
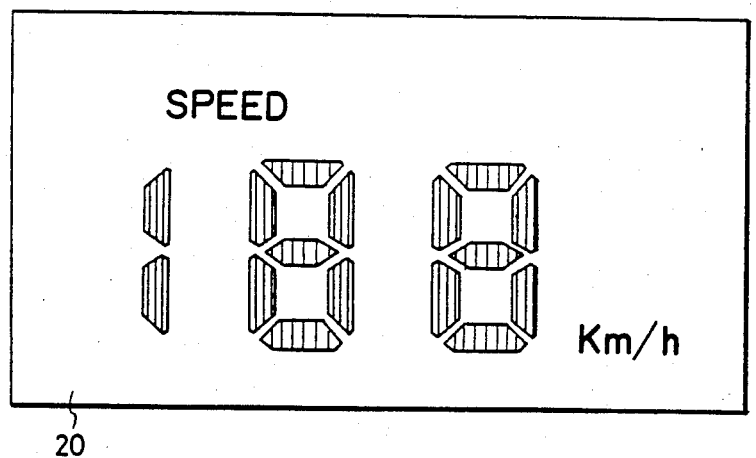
FIG. 5 is a front view exemplifying the unselected segments of the liquid crystal cell comprised in the embodiment shown in FIG. 1.
Figure 6:
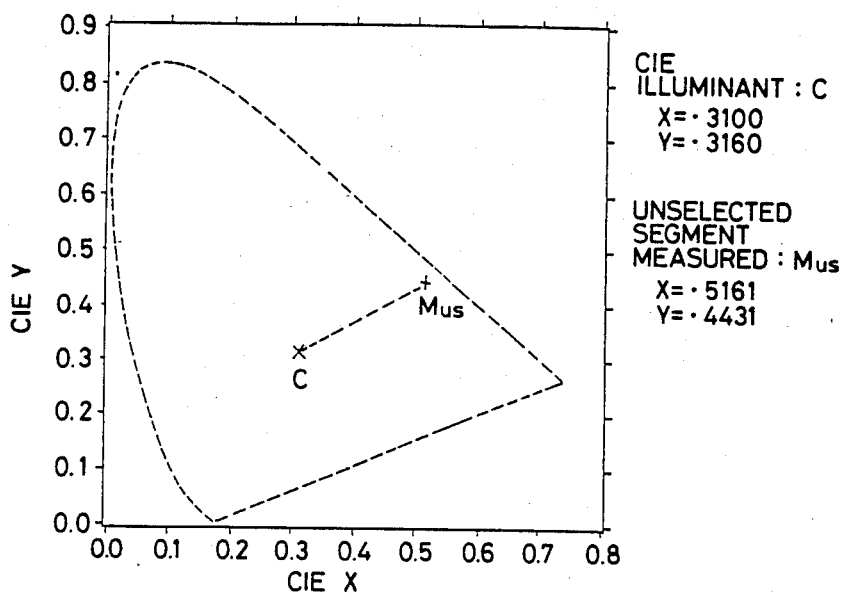
FIG. 6 is a CIE chromaticity diagram of the unselected segments shown in FIG. 5.
Figure 7:
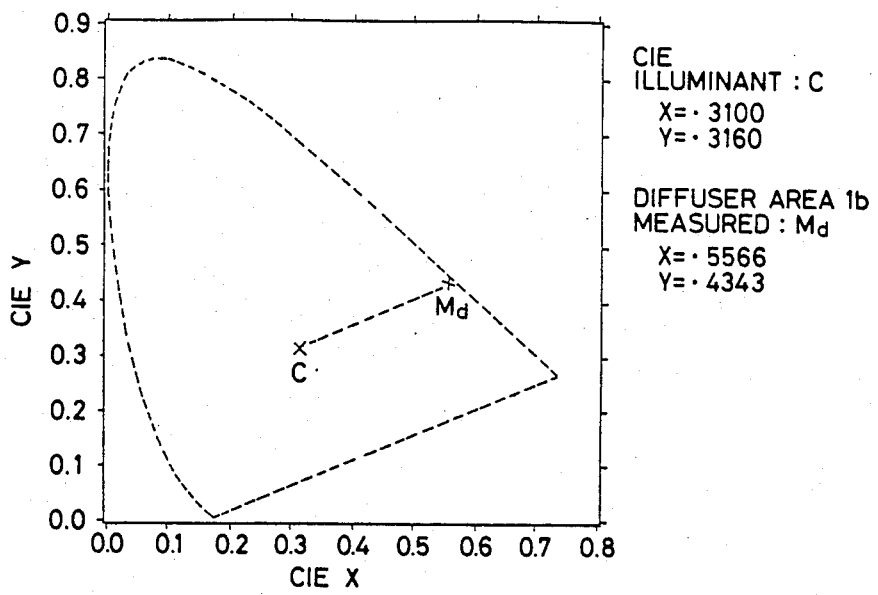
FIG. 7 is a CIE chromaticity diagram of the diffuser comprised in the embodiment shown in FIG. 1.

FIG. 5 is a front view exemplifying the unselected segments of the liquid crystal cell 20 and FIG. 6 is an explanatory diagram showing the CIE chromaticity of the unselected segment obtained when the liquid crystal cell 20 was illuminated by arranging a fluorescent lamp behind the liquid crystal cell 20 shown in FIG. 5. As illustrated in FIG. 6, the chromaticity lies at $x=0.5161$ and $y=0.4431$ (yellowish-orange). In addition, FIG. 7 is an explanatory diagram showing the CIE chromaticity of the area 1b obtained when the foregoing diffuser 1 was illuminated by arranging the fluorescent lamp behind the diffuser 1 shown in FIG. 4. As illustrated in FIG. 7, the chromaticity lies at $x=0.5566$ and $y=0.4343$ (orange). Accordingly, the color scheme of the area 1b is substantially the same as that of the unselected segments of the liquid crystal cell 20.

Figure 8:
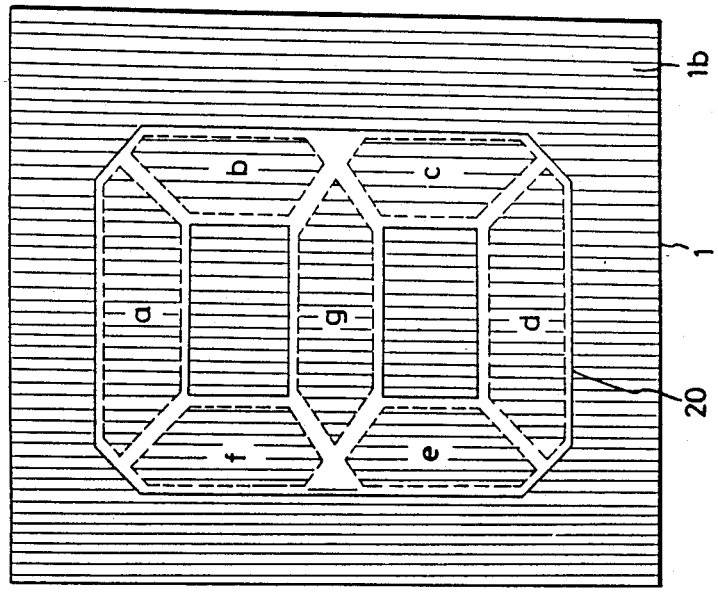
FIG. 8 is an expanded view of essential portions showing an unselected state in this embodiment.

In the embodiment thus constructed, in the unselected state, as shown in FIG. 8, the unselected segments of the liquid crystal cell 20 and the area 1b of the diffuser 1 have substantially the same color scheme. Accordingly, the misrecognition in which the unselected segment looks as if it was illuminated is not feared to arise.

Figure 9:
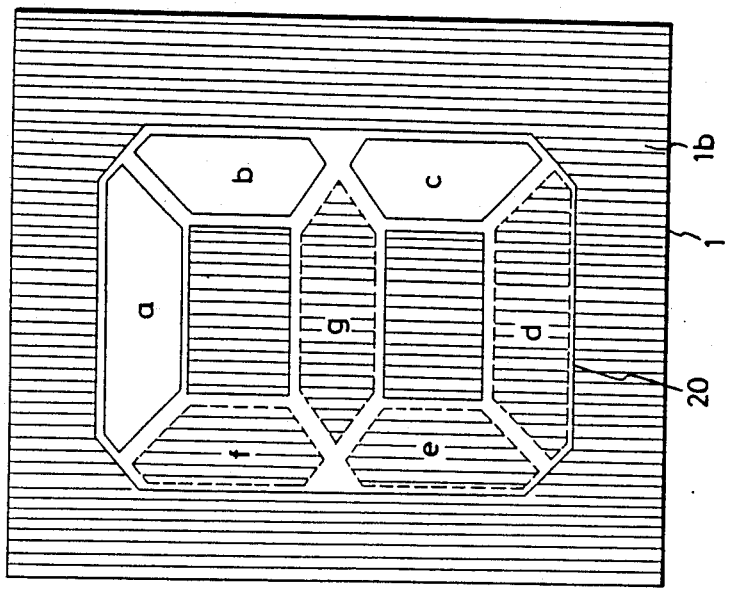
FIG. 9 is an expanded view of essential portions showing a selected state in this embodiment.

In the selected state, as shown in FIG. 9 by way of example, the segments a, b and c are illuminated, and those d, e, f and g are not illuminated. On this occasion, the difference between the color of the selected segments a, b and c and the color of the unselected segments d, e, f and g as well as the area 1b of the diffuser 1 is clear, and the contrast as seen or the outward appearance is favorable. Thus, a display of excellent visual verification can be performed.

While, in the embodiment, the colors of the color filters 23R and 23G consituting the liquid crystal cell 20 have been respectively set at red and green, the present invention is not restricted thereto, but it is also allowed to set all the color filters at an identical color or to set the color filters at colors different from red and green.

While, in the embodiment, the diffuser 1 has been provided and the color scheme of the area 1b thereof has been set equal to that of the unselected segments of the liquid crystal cell 20, the present invention is not restricted thereto. By way of example, with the diffuser 1 omitted, the color scheme of the area of the liquid crystal cell 20 except the patterns to-be-illuminated may well be formed in the same system as that of the color scheme of the unselected segments by, e.g., coating with an ink.

Since the liquid crystal display device is small in size, it is utilized in extensive fields. For example, in the field of vehicles, it is applied to a vehicular instrument panel. A liquid crystal display device for the instrument panel of an automobile is described in, e.g., the official gazette of Japanese Patent Application Laid-open No. 54-158953. There will now be described embodiments of variable color type liquid crystal display devices according to the present invention in the field of vehicular instrument panels.

In the ensuing description, numerals, characters, symbols, graphs or figures to be displayed shall be generally termed "patterns."

Figure 10:
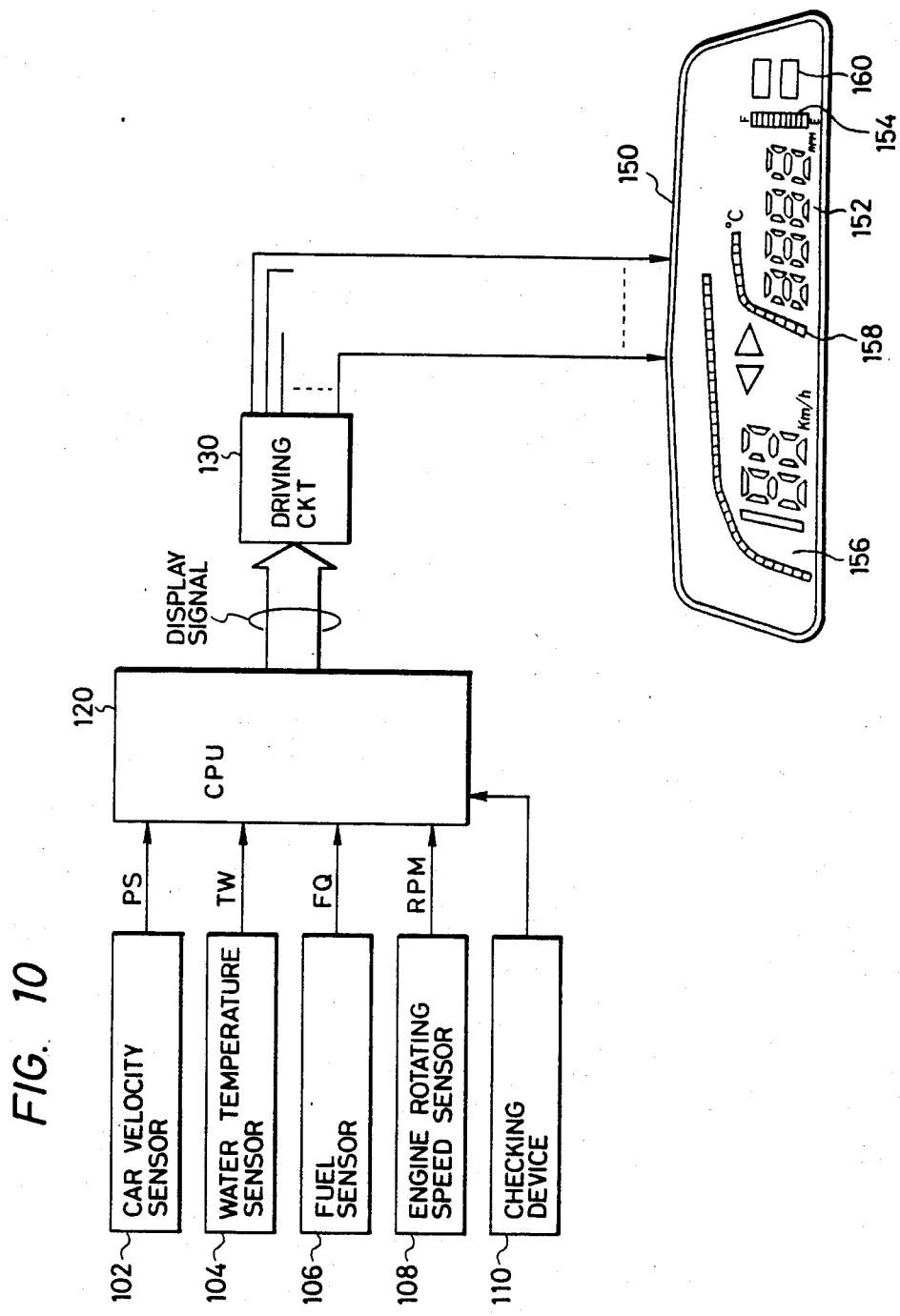
FIG. 10 is a block diagram of a liquid crystal display system for the instrument panel of a vehicle.

FIG. 10 is a block diagram for explaining the principle of one embodiment in this field. Disposed as sensors for measuring physical quantities are, for example, a car belocity sensor 102, a water temperature sensor 104, a fuel sensor 106 and an engine rotating speed sensor 108, which respectively deliver a pulse train PS indicative of a car velocity, a voltage TW indicative of a water temperature, a voltage FQ indicative of a fuel reserve and a pulse train PRM indicative of an engine rotating speed.

A checking device 110 detects any abnormality of, for example, an engine controller, an air condition controller, an information transmission system within a car and various switches in accordance with a known checking method, and it delivers an output to a digital computer 120 (hereinbelow, termed "CPU").

The CPU 120 has an A/D converter and a counter for measurement, and the pulse trains PS and RPM count pulses for a fixed period of time thereby to measure the car velocity and the engine rotating speed respectively. Further, the analog voltage TW and FQ are converted into digital values by the built-in A/D converter of the CPU 120. On the basis of the above measurements, display signals composed of pattern data for displaying patterns and color data for designating the color thereof are output to a driving circuit 130.

The driving circuit 130 applies drive signals for selecting segments constituting the patterns and stripe electrodes constituting the segments, to a liquid crystal cell 150 on the basis of the display signals so as to display the patterns.

The liquid crystal cell 150 has display portions 152, 154, 156, 158 and 160 in order to display the pattern indicative of the engine rotating speed, the pattern indicative of the fuel reserve, the pattern indicative of the car velocity, the pattern indicative of the water temperature and the pattern indicative of the result of the check, respectively.

Figure 11:
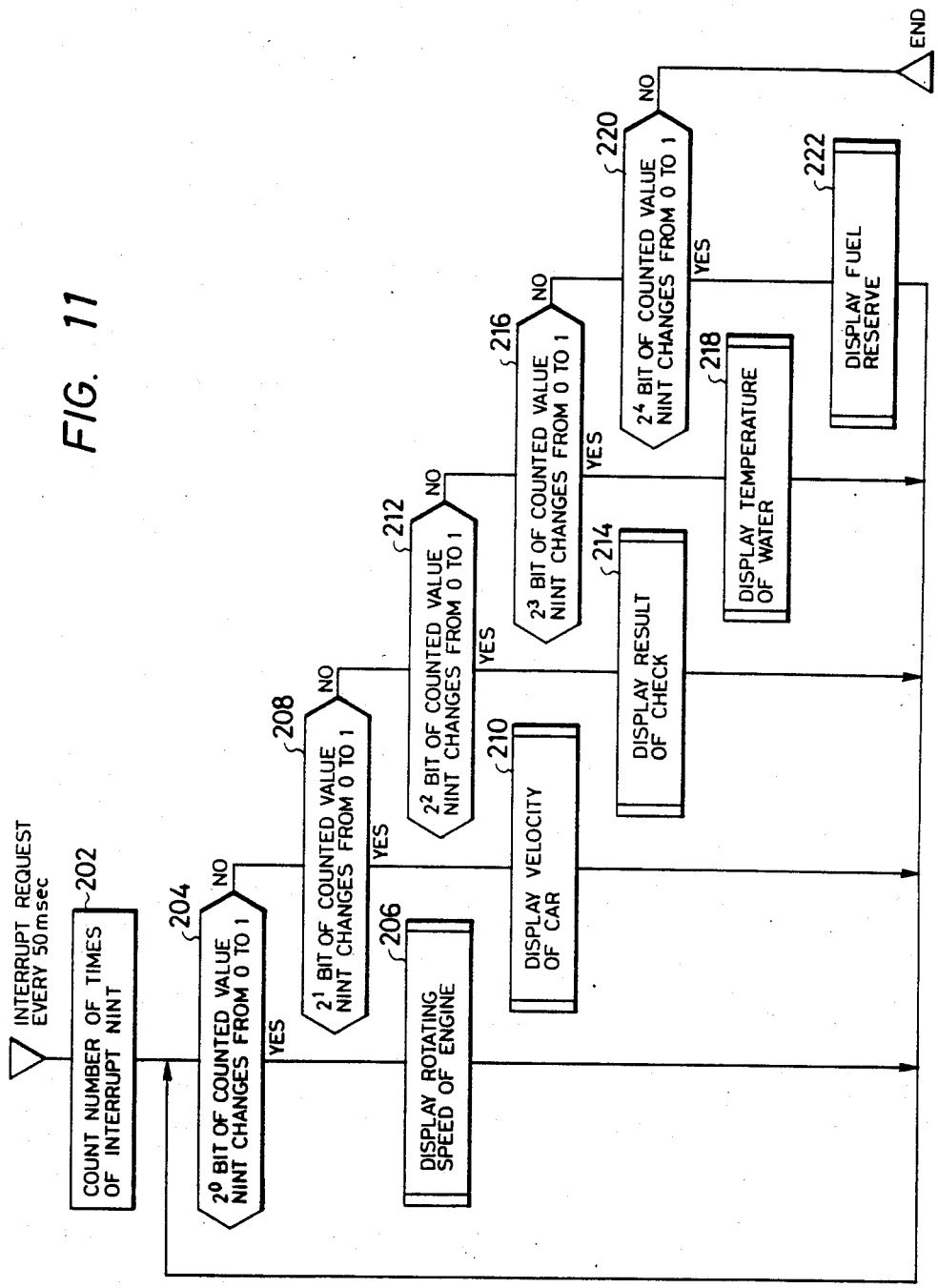
FIG. 11 is a flow chart of the display system in FIG. 10.

FIG. 11 is a flow chart showing the operation of the CPU 120. A step 202 is executed in accordance with an interrupt request made every 50 [msec], and the number of times of the interrupt is counted by this step. The count value is 5 bits at the maximum, and it returns to "0" again after "11111", this operation being repeated. Therefore, the step operates like a free-run counter of 5 bits.

When a step 204 has detected that the least bit or $2^0$ bit has changed from zero to "1", a step 206 is executed. Accordingly, the step 206 is executed every 100 [msec]. A subroutine program indicated by this step 206 will be described later.

After the execution of the step 206, the control flow returns to the step 204 again. Here, the change of the $2^0$ bit from zero to "1" has already been responded to, and the decision is "NO", whereupon the control flow proceeds to a step 208. At this step 208, it is detected that the $2^1$ bit of the count value NINT has changed from zero to "1", and a cycle in which a subroutine 210 is to be executed is determined. Consequently, the subroutine 210 is executed every 200 [msec].

Likewise, a step 212 detects the change of the $2^2$ bit of the count value NINT from zero to "1", and steps 216 and 220 detect the changes of the $2^3$ bit and $2^4$ bit of the count value NINT from zero to "1" respectively. Subroutines 214, 218 and 222 are respectively executed according to the detections. Accordingly, the subroutines 214, 218 and 222 are respectively executed at cycles of 400 [msec], 800 [msec] and 1600 [msec].

As stated above, the steps 204, 208, 212, 216 and 220 grasp the first changes of the corresponding bits of the count value and function to execute the corresponding subroutines to be described later. Once the subroutines have been executed, the steps 204, 208, 212, 216 and 220 give decisions "NO" from the next deciding operation forward unless new changes occur. Accordingly, when the corresponding bits have become "1" again after changing to zero once, the steps give decisions "YES" again.

In the above flow, it can occur that a plurality of subroutines among the subroutines 206, 210, 214, 218 and 222 reach the conditions of execution at the same time. In that case, the priority level is higher as the decision on the execution is earlier.

Figure 12:
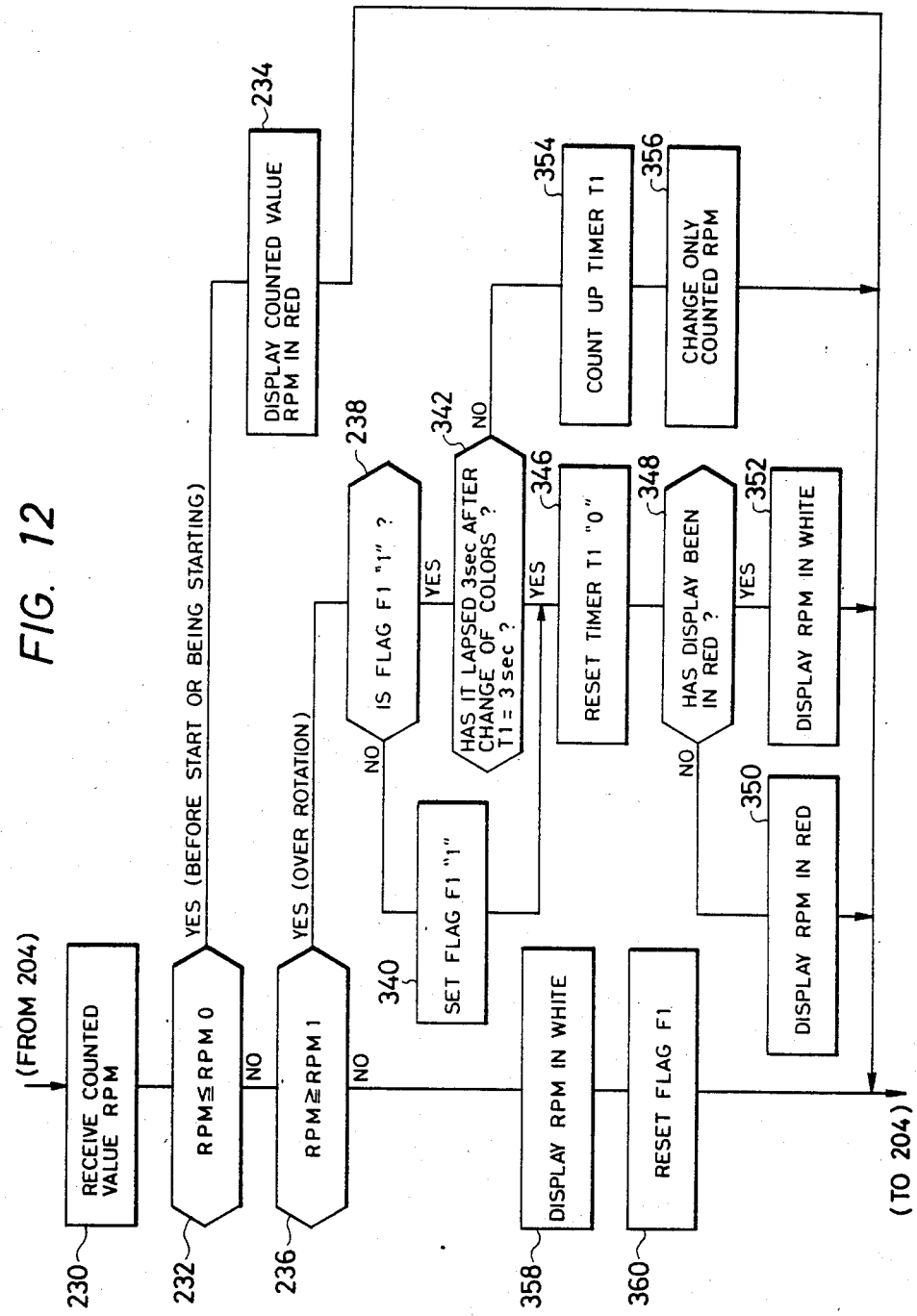
FIG. 12 is a flow chart showing the subroutine of display processing for an engine rotating speed.

The details of the subroutine 206 are shown in FIG. 12. A step 230 receives the counted value RPM from the built-in counter of the CPU 120 which is counting the output pulses of the sensor 108 shown in FIG. 10, and a step 232 decides if the engine is operating. If the counted value RPM is not greater than a predetermined value RPM0, the engine is in the state before starting in which the rotation is stopped, or it is starting. In this case, the control flow proceeds to a step 234, in which a display signal for displaying the counted value RPM received from the counter in red is sent to the driving circuit 130, to set the counted value RPM in the pattern register (502 in FIG. 13) of the driving circuit 130 and a signal indicative of red in the color register (504 in FIG. 13) thereof.

When the engine rotating speed RPM is greater than the predetermined value RPM0, the step 232 decides that the engine is operating, and it is followed by a step 236. This step 236 decides if the engine rotation is a dangerous rotation. When the rotating speed RPM has reached a predetermined value RPM1, the drive of the car is decided to be in the dangerous rotating speed range of the engine, and the control flow proceeds to a step 238 for alarm display. A flag F1 is checked in order to decide if the dangerous state has continued since. In a case where the dangerous state has been first established this time, the flag F1 is "zero", and it is set to "1" at a step 340. Accordingly, from the next operation forward, the step 238 will decice dangerous state to be continuing before then. In a step 346, the data T1 of a RAM held as a timer is rendered zero. The time T1 is used for changing the color of display every 3 seconds, along with steps 342 and 354. A step 348 decides if the last display is in red. Since, in this case, the last display is not in red, the control flow proceeds to a step 350, in which the engine rotating speed RPM is set in the pattern register 502 and color data for displaying red is set in the color register 504.

When, in the step 238, the continuation of the dangerous state before now is decided from the fact that the flag F1 is "1", the color of display is changed each time 3 seconds lapses. The lapse of 3 seconds is detected on the basis of the value of the timer T1 in the step 342. In a case where 3 seconds has lapsed, the timer T1 is rendered zero in the step 346. Subsequently, the step 348 decides if the display is in red. In a case where the display has not been in red, the step 350 inputs the engine rotating speed RPM to the pattern register 502 and red displaying data to the color register 504 for the purpose of the red display. On the other hand, when the step 348 decides the display has been in red, it is followed by a step 352, in which the engine rotating speed RPM is input to the pattern register 502 and white information is input to the color register 504.

When, in the step 342, it is decided on the basis of the timer T1 that 3 seconds has not lapsed since the last change of colors, the step 354 counts up the timer T1, and a step 356 sets only the engine rotating speed in the pattern register and holds the content of the color register as it is. Under the above control, when the engine rotating speed is in the dangerous range, the colors of display change every predetermined period of time, for example, every 3 seconds.

Meanwhile, when the engine rotation is at an ordinary rotating speed, the control flow proceeds from the step 236 to a step 358, in which to the end of displaying the engine rotating speed in white, the engine rotating speed is input to the pattern register 502 and data indicative of white is input to the color register 504. In addition, the flag F1 set in the step 340 is reset to zero by a step 360 because the normal operation has been restored.

Figure 13:
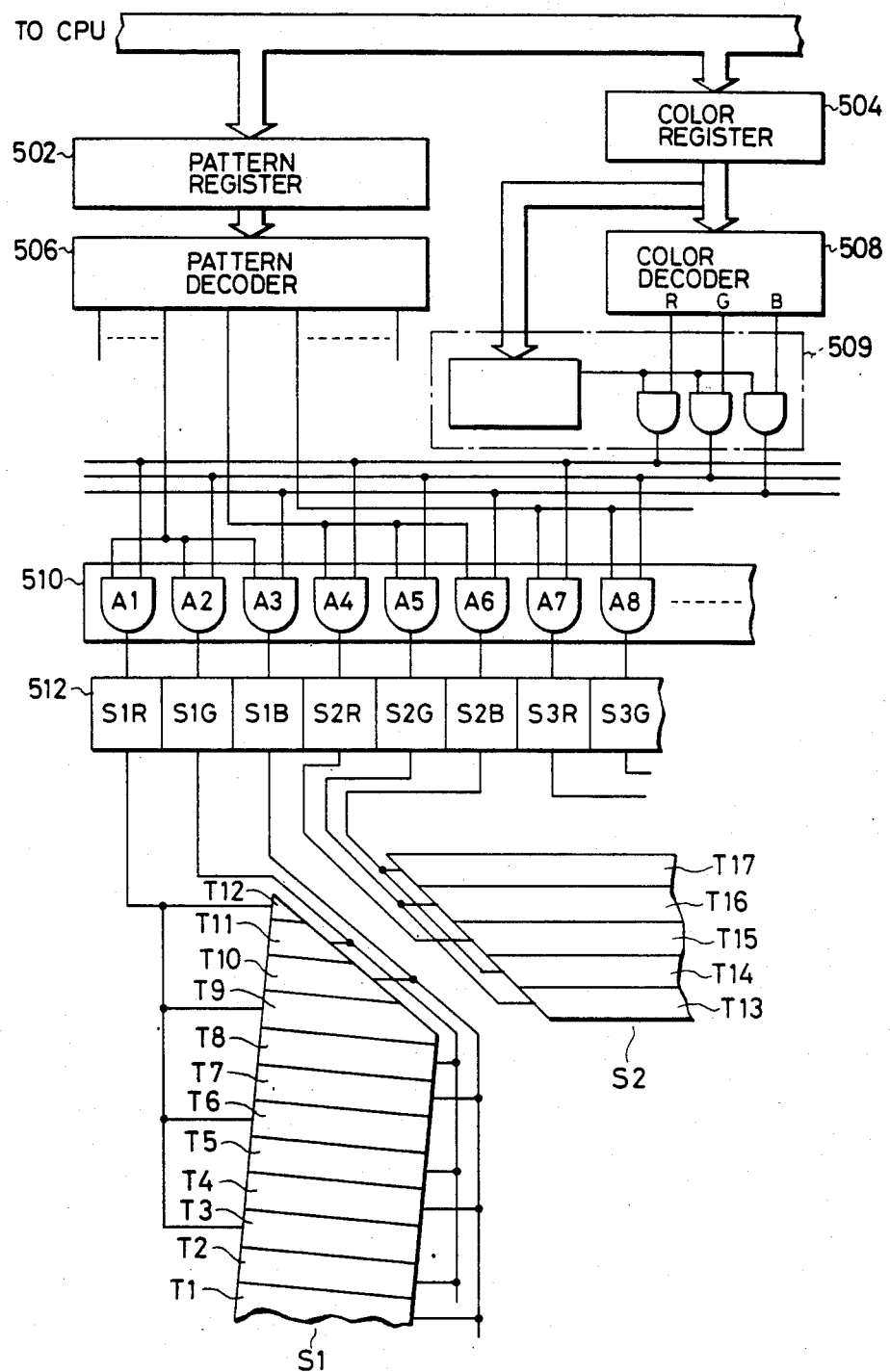
FIG. 13 is a detailed diagram of a portion concerning the engine rotating speed display in the system of FIG. 10.

FIG. 13 is an expanded diagram of the portions concerning the engine rotating speed display, of the driving circuit 130 and the liquid crystal cell 150 in FIG. 10. Among the processed results based on the flow chart shown in FIG. 12, the engine rotating speed data is set in the pattern register 502, and it is passed through a decoder 506 to generate signals as to whether or not segments S1, S2 . . . constituting a pattern are to be displayed respectively. In case of displaying the segments S1 and S2, signals "1" are respectively sent from the pattern decoder 506 to AND gates A1, A2, A3, A4, A5 and A6 in an AND gate array 510.

On the other hand, the color data is input to the color register 504 on the basis of the processing in FIG. 12, and it is passed through a color decoder 508 and a pulse generator circuit 509 to generate driving pulses for controlling the color and the brightness thereof. By way of example, when the data indicative of white is input to the register 504, a red signal R, green signal G and blue signal B are respectively output from the color decoder 508, and pulses of a pulse duration based on the white data are applied from the pulse generator 509 to the AND gates A1–A6, together with the outputs of the decoder 506. Then, switches S1R, S1G, S1B, S2R, S2G and S2B in a switch array 512 are respectively actuated to supply pulse voltages to all stripe electrodes T1–T17. Thus, the segments S1 and S2 are displayed in white. The pulse generator 509 will be described later with reference to FIG. 25.

Here, although the stripe electrodes T1–T17 are actually fine stripe electrodes, they are illustrated as being very broad for the sake of explanation. As will be stated later, the stripe electrodes T1–T17 are electrodes on one side for liquid crystal display, and though not shown, electrodes on the other side exist so as to hold a liquid crystal between the electrodes on both the sides. By applying a voltage across both the electrodes, the alignment of the liquid crystal is changed, and light is transmitted or intercepted. In the transmission path of the light in the state in which the light is transmitted, a color filter is disposed in correspondence with the stripe electrode. Therefore, the transmitted light is colored by the filter, and stripe-like colored light is formed in correspondence with the stripe electrode. This light forms the pattern.

The above embodiment is so fabricated that the light is transmitted when the voltage is applied to the counter electrode. It is also allowed, however, that the transmission of light is intercepted by the application of a voltage contrariwise. In this embodiment, when the voltages are applied between the electrodes T1, T4, T7, T10, T14 and T17 and the counter electrodes, the stripe-like light in blue appears in correspondence with the operations of the electrodes. In addition, when the voltages are applied to the electrodes T2, T5, T8, T11, T13 and T16, green light appears. Besides, when the voltages are applied to the electrodes T3, T6, T9, T12 and T15, red light appears.

Though not shown in the drawing, the other segments are similarly constructed of stripe electrodes. In each segment, the stripe electrodes of the same color are connected by wiring, whereby the numbers of the outputs of the decoders can be reduced.

Although, in this figure, the pattern register 502 as well as the color register 504, the pattern decoder 506 as well as the color decoder 508, and the AND gate array 510 are individually and separately constructed so as to facilitate understanding of the operation, they may well be unitarily put into an IC. Besides, the pattern register 502 and the color register 504 may well be unitarily constructed so as to realize "read" and "write" with a single address. Further, the pattern decoder 506, the color decoder 508 and the AND gate array 510 may well be unitarily constructed.

Figure 14:
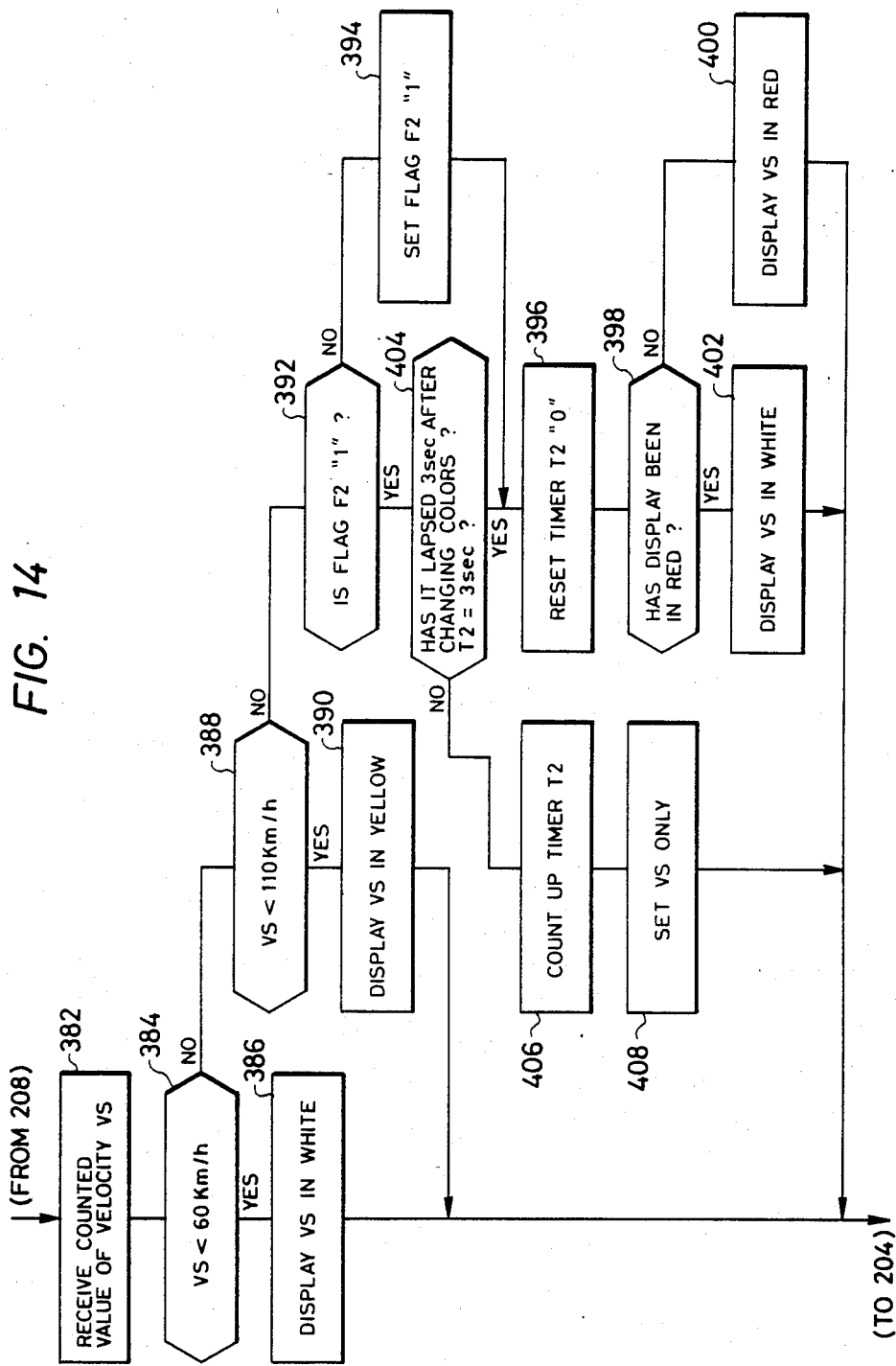
FIG. 14 is a flow chart showing the subroutine of display processing for a car velocity.

The details of the subroutine 210 are shown in FIG. 14.

A step 382 receives the car velocity VS measured by the built-in counter of the CPU 120 in FIG. 10, and a step 384 decides if the car velocity is less than 60 km/h. When the velocity per hour is less than 60 km, a step 386 sets the car velocity VS in a pattern register 542 in FIG. 15 and white in a color register 544 through a bus line 550 to the end of displaying the car velocity VS in white.

When the car velocity VS is at least 60 km/h, a step 388 decides if the velocity per hour is less than 110 km. When the velocity per hour is less than 110 km, a step 390 sets the car velocity VS in the register 542 and yellow in the register 544 to the end of displaying the car velocity VS in yellow.

On the other hand, when the car velocity VS is at least the velocity-per-hour of 110 km, the control flow proceeds to a step 392 in order to display the car velocity with the flickering of red, and on the basis of a flag F2, this step decides if the velocity per hour has first become at least 110 km this time. When the velocity has been first reached, a step 394 sets the flag F2 to "1", and a step 396 resets to zero a timer T2 for measuring a flickering cycle. In order to display the car velocity in red, the control flow proceeds from a step 398 to a step 400, in which car velocity data is set in the register 542 and a red signal is set in the register 544.

Next, in a case where the velocity per hour has been 110 km or greater since, the flag F2 is "1", so that the control flow proceeds from the step 392 to a step 404. Here, it is decided from the timer T2 whether or not display in the same color has continued for 3 seconds. When it has not continued for 3 seconds, a step 406 counts up the timer T2 in order to indicate time lapse, whereupon in a step 408, only the car velocity data VS is set in the register 542 and the content of the register 544 holding the color data is not changed.

On the other hand, when the display in the same color has lapsed for 3 seconds, the timer T2 is reset to zero for the measurement of the next 3 seconds, and whether or not the color displayed till now is red is decided for the change of colors. When the display has been in red, a step 402 sets the car velocity data VS in the register 542 and white data in the register 544 to the end of displaying the car velocity in white. When the display has been in white till now, the step 400 sets the car velocity data VS in the register 542 and red data in the register 544. In the way thus far described, the car velocity display step 210 in FIG. 11 is executed.

Figure 15:
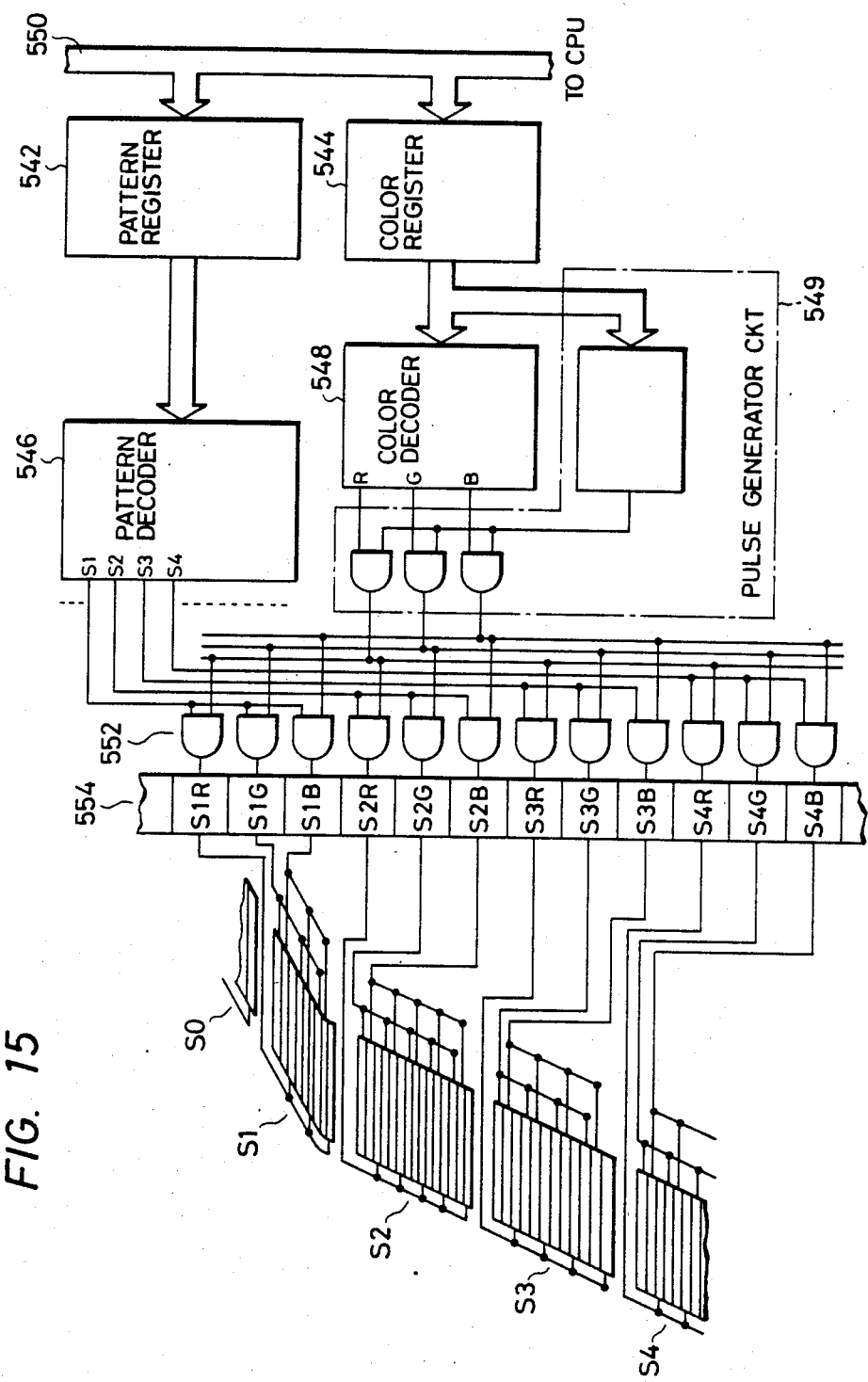
FIG. 15 is a detailed diagram of a portion concerning the car velocity display in the system of FIG. 10.

FIG. 15 is a block diagram showing the car velocity displaying circuit of the driving circuit 130 and part of the liquid crystal cell 150 in FIG. 10. The operating principle of this circuit is the same as in FIG. 13. Some S0–S4 of the segments for graphically displaying the car velocity are respectively constructed of stripe electrodes. The stripe electrodes are connected for the respective same colors within each segment, and they are supplied with pulse voltages from the corresponding elements ... S1R–S4B ... of switching elements 554. The segments are determined by the display precision of the car velocity. By way of example, at a precision of 1 [km/h], the number of the segments to be displayed increases by one as the car velocity rises by 1 [km/h]. The precision is enhanced as the number of segments constituting the pattern is increased. The number and color of the segments to be displayed are determined by data items set from the CPU, and the data items are held in the registers 542 and 544 respectively. A digital value indicative of the car velocity is held in the register 542, and signals for selecting display segments are sent from a pattern decoder 546 to AND gates 552 in order that the segments in a number corresponding to the value may be displayed. On the other hand, a color signal is sent from a color decoder 548 to an AND gate in the pulse generator 549 on the basis of signals from the color register 544, a pulse is sent from this AND gate to the AND gates 552, and the seldcted segments are displayed in the designated color. As in FIG. 13, the decoders 546 and 548 and the AND gates 552 can be unitarily constructed, and the registers 542 and 544 can also be unitarily constructed.

While, in FIG. 10, the car velocity is also displayed with a numerical pattern, a circuit therefor has an arrangement similar to that in FIG. 13 and is omitted from FIG. 15. The pulse generator circuit 549 is similar to the circuit 509 in FIG. 13, and will be described later with reference to FIG. 25.

FIG. 16 is a flow chart showing the software of checking, and indicates the details of the subroutine 214 in FIG. 11. A step 422 receives the output of the checking device 110 in FIG. 10. A step 424 decides the presence of a trouble from the result of the check. In the presence of the trouble, a step 426 sends red display data to a register 572 in FIG. 17 to the end of displaying the trouble.

On the other hand, in the absence of any trouble, whether or not a key switch is in the state of an accessory switch (ACC) is decided. White is displayed in only the state of the accessory switch. Since the white display displays all the colors red, blue and green of the stripe electodes, it is suited to check the troubles of the display circuit and the display elements. A step 430 sets white display data in the register 572. Further, in the normal state of the engine, a step 432 stops the display. Therefore, the held value of the register 572 is cleared so as to present black.

FIG. 17 shows part of a trouble displaying portion in the driving circuit 130 and liquid crystal cell 150 in FIG. 10. Here, a pattern is constructed of a single segment. Accordingly, a selector circuit for the segment is unnecessary. Color data is set in the register 572, and a color signal is produced by a decoder. The color signal is input to the gate of a pulse generator circuit 575, and a switching element 576 is operated by a pulse from this gate, to apply a pulse voltage to a stripe electrode constituting the segment 578. The stripe electrodes are of the three sorts of red, blue and green, and are respectively operated by the switching elements 576 SR, SG and SB. When white is to be displayed, the pulse voltages are applied to all the stripe electrodes.

Figure 18:
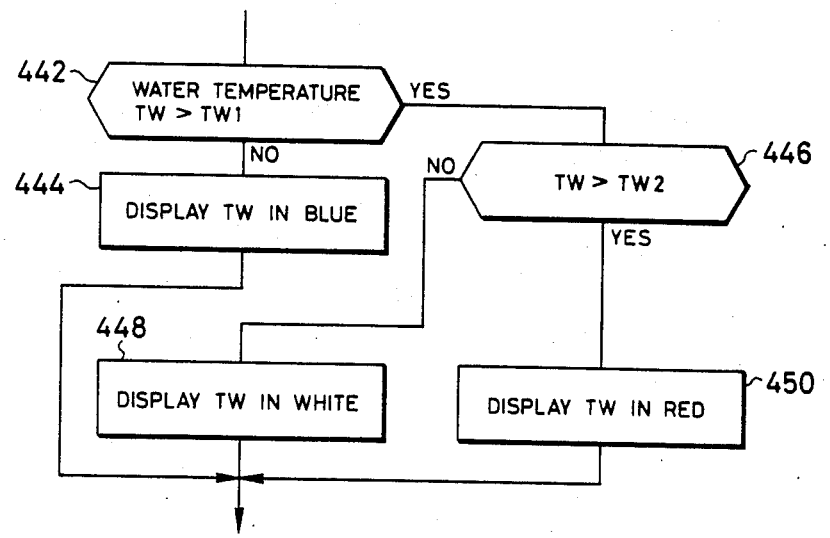
FIG. 18 is a flow chart showing the subroutine of display processing for a water temperature.

FIG. 18 shows a detailed flow of the subroutine 218 in FIG. 11. A step 442 decides if the value TW sampled from the water temperature sensor 4 corresponds to an overcooled state, by comparing it with a predetermined value TW1. When the water is overcooled, data for displaying the water temperature TW in blue is sent to the driving circuit 130.

When the water temperature TW is higher than the predetermined value TW1, it is compared with a value TW2 in order to decide an overheated state. When the water is overheated, data for displaying the water temperature in red is sent to the driving circuit 130 by a step 450. When the water is in the normal water temperature state, data for displaying the water temperature in white is sent to the driving circuit 130 by a step 448.

The driving circuit for displaying a water temperature graph has an arrangement similar to that in FIG. 15, and it outputs display signals in order to display segments in a number corresponding to the value of the water temperature TW, among segments which constitute the graph being a pattern. Further, the color of stripe electrodes in each segment, to be driven is determined by color data and the display color of the segments to be displayed is determined.

Figure 19:
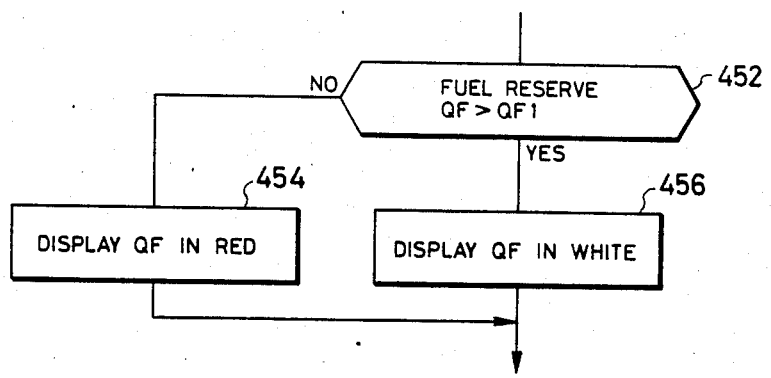
FIG. 19 is a flow chart of the subroutine of display processing for a fuel reserve.

FIG. 19 illustrates means to display the fuel reserve. A step 452 compares the output of the fuel sensor 106 with a value QF1 indicative of insufficient fuel. In case of the fuel insufficiency, the fuel reserve is displayed in red by a step 454, and in case of the normal quantity, the fuel reserve is displayed in white by a step 456.

The arrangement of the liquid crystal cell and the driving circuit for displaying the fuel reserve is the same as that in FIG. 15 for the graphical display. The number of segments to be displayed is determined by the fuel reserve, and among stripe electrodes constituting each segment to be displayed, those selected by the color signal are supplied with voltages so that the color of the segments may become the color specified by the step 454 or 456.

Figure 20:
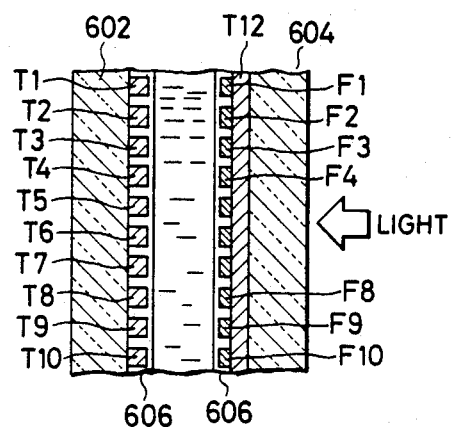
FIG. 20 is a sectional view of an example of a liquid crystal cell.

FIG. 20 is a partial enlarged sectional view of the liquid crystal cell shown in FIG. 10. Transparent stripe electrodes T1–T10 constituting each segment are provided on one glass plate 602, whle a common electrode T12 is provided on the other glass plate 604, and a liquid crystal is confined between these electrodes. In addition, color filters F1–T10 are provided on the surface of the common electrode in correspondence with the respective stripe electrodes, and the colors of these color filters are the repetition of red, green and blue. For example, the color filter F1 is a red filter, the color filter F2 is a green filter, and the color filter F3 is a blue filter. When a voltage is applied to the electrode T1, the alignment of the liquid crystal betweeh this electrode T1 and the common electrode T12 changes, and light corresponding to the width of the stripe electrode T1 is transmitted across the glass plates 602 and 604. Accordingly, this light becomes the color of red possessed by the filter F1. Likewise, green light is caused to appear by applying a voltage across the electrodes T2 and T12.

Since the stripe electrodes are fine, lights of different colors transmitted are seen in a color with the colors synthesized. Accordingly, when all the electrodes are driven, white being the synthetic color of red, green and blue is presented.

Figure 21:
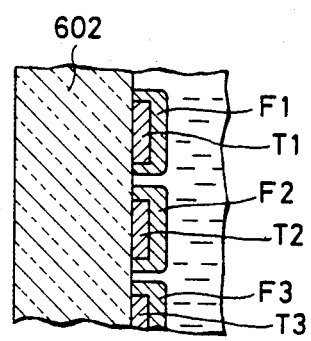
FIG. 21 is a sectional view of another example of a liquid crystal cell.

FIG. 21 shows another embodiment of the liquid crystal cell. In this example, color filters are respectively provided on stripe electrodes T1–T3 . . . which are provided on a glass plate 602 on one side, and the transparent electrodes T1, T2, T3 . . . are respectively covered with dyed films made of gelatine materials (dyeing bases). The liquid crystal cells in FIG. 20 and FIG. 21 are provided with aligning layers 606 hitherto known, on the surfaces of the electrodes and the color filters.

Figure 22:
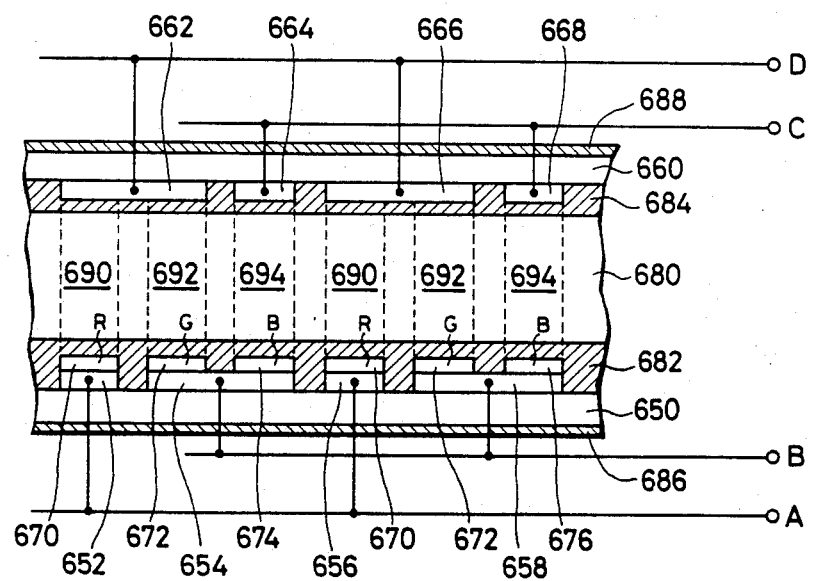
FIG. 22 is a sectional view of still another example of a liquid crystal cell.

FIG. 22 shows another embodiment of the liquid crystal cell, and is a partial enlarged view of one of a large number of segments of the liquid crystal cell as taken transversely to stripe electrodes. Stripe electrodes 652, 654, 656 and 658 are disposed on a lower glass plate 650, while stripe electrodes 662, 664, 666 and 668 are disposed on an upper glass plate 660. The upper plate side electrodes and the lower plate side electrodes are arranged in such a relationship that they shift from each other by about half of an electrode width. Thus, each of the stripe electrodes functions for two of the stripe electrodes explained in the foregoing embodiments. By shortcircuiting the electrodes and then leading them out, lead-out terminals are further decreased.

Among the stripe electrodes, those 652 and 656 are pvodided with red filters 670, and those 654 and 658 are provided with green filters 672 and blue filters 674 and 676. In this embodiment, the stripe electrode width is made greater than double a filter width by an insulation interval. However, the filter width and the electrode width are substantially equal in some electrodes such as the electrodes 652 and 656.

The electrodes on the upper and lower plates are surrounded with aligning layers 682 and 684 for aligning a liquid crystal material 680.

Besides, polarizing plates 686 and 688 are respectively stuck on the outer surfaces of the glass plates 650 and 660, and the light absorption axes thereof are set in the same direction. When no voltage is applied, the axis of light is rotated by the liquid crystal, and light is entirely absorbed and is not transmitted. On the other hand, when a voltage is applied, the rotation of the liquid crystal between the respective electrodes disappears, and light is transmitted coaxially. The transmitted light bears a color owing to the filter. This operating principle holds true also in the foregoing embodiments, and the polarizing plates and the aligning layers are omitted in FIGS. 20 and 21.

In each segment, a rectangular wave voltage is applied across the electrodes for the purpose of color display. With some methods of applying the voltages, not only a single color but also a mixed color can be presented.

Figure 23A:
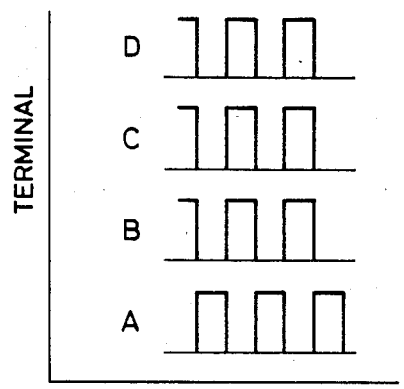
FIGS. 23(a) and 23(b) are diagrams for explaining the operations of the liquid crystal cell in FIG. 22.

Examples of the display will be described with reference to FIGS. 23(a) and 23(b). FIG. 23(a) exemplifies red display, in which a terminal A is rendered opposite in phase to terminas B, C and D and a potential arises only across the electrodes 652 and 662. Consequently, only a portion 690 in the liquid crystal transmits light, and only the red filter 670 transmits light.

Figure 23B:
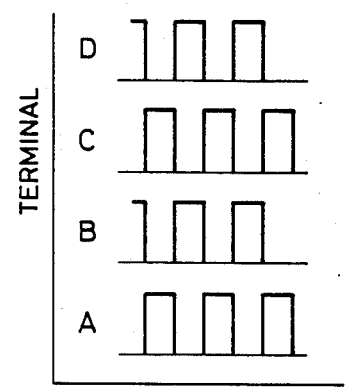

A case of displaying the mixed color between red and blue is illustrated in FIG. 23(b). Pulses of opposite phases are impressed across the terminals A, C and the terminals B, D, and the liquid crystal 690 between the terminals A and D transmits light. Further, the liquid crystal 694 between the terminals B and C transmits light.

In a similar way, when pulses of opposite phases are impressed across the terminals B and D, a portion 692 in the liquid crystal transmits light. Thus, the filters 670, 672 and 674 can be controlled so as to transmit or intercept light, and the light of the segment can be controlled.

The relations between the display colors and the pulse phases of the termianls A, B, C and D are listed in Table 1.

pulse, and "1" the impression of the opposite-phase pulse.

Figure 24:
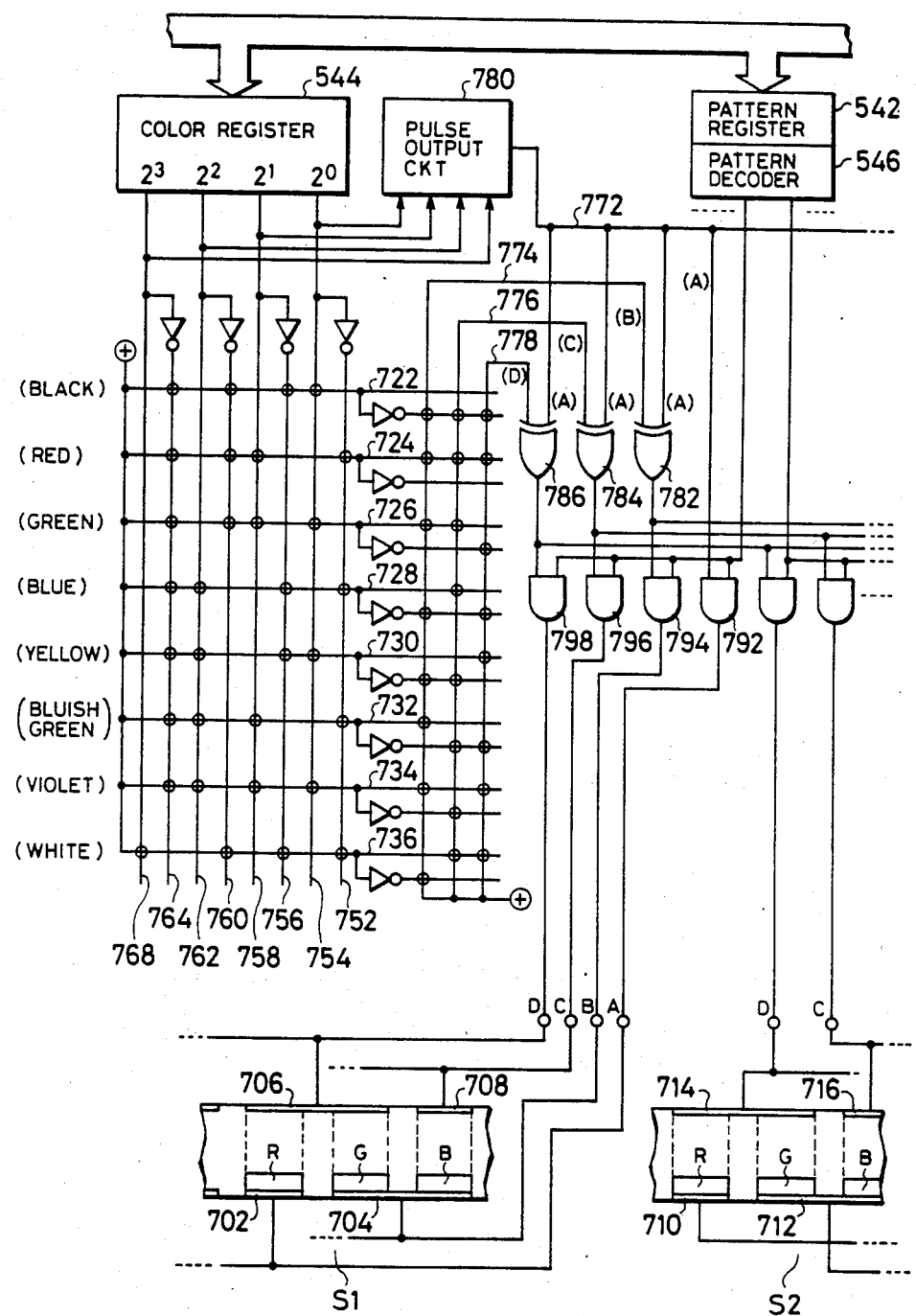
FIG. 24 is a diagram showing an example of a driving circuit for the liquid crystal cell in FIG. 22.

An embodiment in the case of using the liquid crystal cell of FIG. 22 as that of FIG. 10 will be described with reference to FIG. 24. As a typical example, the car velocity displaying circuit in FIG. 15 will be explained. Segments S1 and S2 in FIG. 24 are used for displaying a bar graph indicative of a car velocity, along with other segments not shown, and the length of the bar graph is given by the number of displayed segments. Which segments are to be displayed, is determined by the car velocity set in the pattern register 542. As already stated, this car velocity is decoded by the pattern decoder 546, and the display signals corresponding to the respective segments are output. Meanwhile, on the basis of the signals input to the color register 544, signals indicated by (B), (C) and (D) are formed by a method to be explained below. The signals of the terminals A, B, C and D listed in Table 1 are formed on the basis of these signals.

Numerals 1–8 are successively assigned to the display colors of black to white in Table 1, and they are set in the color register 544. From the set values, signals (black), (red), (green), ... (violet) and (white) are generated on lines 722, ... and 736. Each circle in the figure indicates an element functioning as an AND condition, for example, field effect transistor. Each of the lines 722–736 is constructed of a series circuit consisting of eight FETs. Output $2^0$–$2^3$ lines and the "invert" lines thereof, 752–768 from the register 544 are respectively connected to the gates of the transistors, and each transistor is electrically short-circuited when a high level signal is input to its gate.

At each cross point without the circle in the figure, the source and drain of a FET are short-circuited beforehand. Accordingly, current flows irrespective of the gate potential of the FET. In contrast, the short-circuit of the portion of the circle depends upon the gate potential of the FET. Accordingly, whether or not each of the lines 722–736 becomes the high level is determined depending upon whether or not all the series FETs of the line are in the conductive states, and it is determined by the AND conditions of the outputs of the lines 722–736, the signals (B), (C) and (D) are produced on the lines 774–778. The relations are as indicated in Table 1.

A matrix which consists of the lines 774–778, the lines 722–736 and the lines of the inverted signals of the signals of the lines 722–736 operates as a kind of decoder, and this decoder is also considered as a memory for storing the conditions of Table 1. The relationship of Table 1 can be altered by changing the positions of the circles in the figure. One of the two sorts of signals in Table 1, for example, "1" corresponds to the position of

TABLE 1

| Display Color Terminal | Black CL01 | Red CL02 (R) | Green CL03 (G) | Blue CL04 (B) | Yellow CL05 (R · G) | Bluish Green CL06 (G · B) | Violet CL07 (B · R) | White CL08 (R · G · B) |
|---|---|---|---|---|---|---|---|---|
| A | 0 | 0 | 0 | 0 | 0 | 0 | 0 | 0 |
| B | 0 | 1 | 1 | 0 | 0 | 1 | 1 | 0 |
| C | 0 | 1 | 1 | 1 | 0 | 0 | 0 | 1 |
| D | 0 | 1 | 0 | 0 | 1 | 0 | 1 | 1 |

This table indicates the potentials of the terminals B, C, D at the timing at which the terminal A is of low potential. "0" denotes the impression of the in-phase the circle.

Each of lines 774, 776 and 778 is constructed of a series circuit consisting of, e.g., 16 FETs, and the source and drain terminals of the series FET are short-circuited at each part without a circle. The lines 722-736 and the lines of the inverted signals of the signals of the former lines are respectively connected to the gates of the corresponding series FETs. Accordingly, whether or not the FETs turn "on" is determined depending upon whether the signals of these lines are "high" or "low". In contrast, the cross points without the circles are operated irrespective of the signals because the sources and drains of the FETs are short-circuited. Owing to the above arrangement, the signals (B), (C) and (D) are respectively generated on the lines 774, 776 and 778 on the basis of the relations of Table 1 and are input to the exclusive OR (EOR) gates.

One input of each of the EOR gates 782, 784 and 786 is supplied with a pulse (A) produced by a pulse output circuit 780, while the other inputs of the respective EOR gates are supplied with the signals (B), (C) and (D) appearing on the lines 774, 776 and 778. When the signals (B), (C) and (D) of the lines 774, 776 and 778 are at the high level, the outputs of the EOR gates 782, 784 and 786 become antiphase to the signal (A), respectively, and when they are at the low level, they become inphase with the signal (A). Accordingly, the outputs of the respective EOR gates meet the relations of Table 1 with respect to the signal (A).

The outputs of the EOR gates and the pulse (A) are respectively applied to AND gates 792, 794, 796 and 798, and the AND conditions thereof with signals from the pattern decoder 546 concerning the display of the corresponding segment determine whether or not pulses are to be delivered to the terminals A, B, C and D. Owing to the embodiment thus far described, the pattern set from the CPU into the register 542 is displayed according to the color signal set from the CPU into the register 544. While, in the present embodiment, the color decoder and the pattern decoder are separately provided, they can also be unitarily formed.

Figure 25:
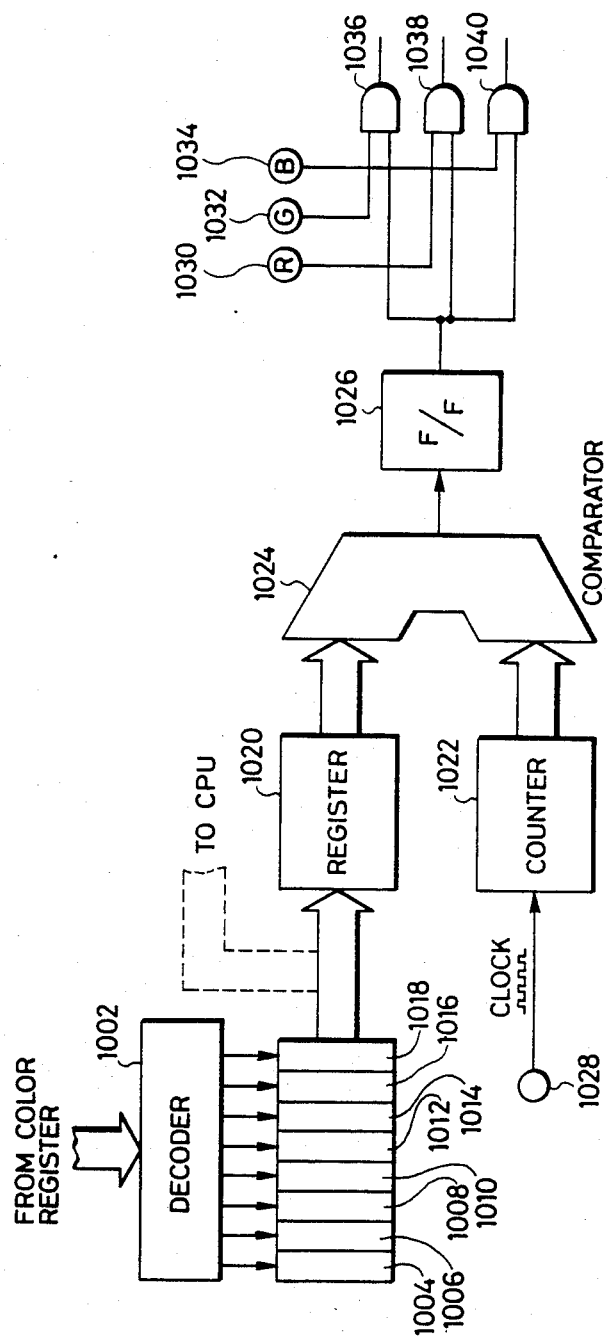
FIG. 25 is a detailed block circuit diagram of a pulse generator circuit showin in FIG. 13, 15 or 17 or a pulse output circuit in FIG. 24.

Shown in FIG. 25 is the detailed circuit arrangement of each of the respective pulse generator circuits 509, 549 and 575 in FIGS. 13, 15 and 17 and the pulse output circuit 780 in FIG. 24.

The color data held in the color register is input to a decoder 1002. Here, it is converted into a signal of the corresponding color, and the signal is input to any of pulse duration holding circuits 1004–1018. That is, the decoder 1002 selects one of the pulse duration holding circuits 1004–1018. The data of the selected pulse duration holding circuit is applied to a register 1020.

Figure 26:
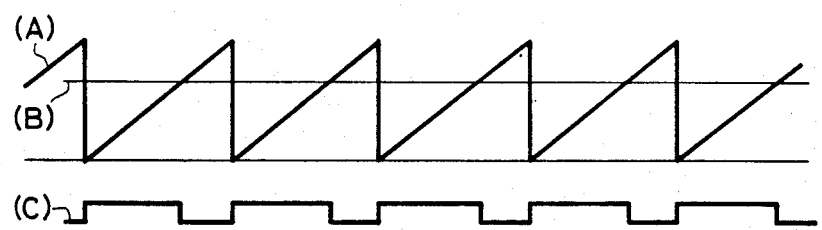
FIG. 26 is a diagram for explaining the operations of blocks in FIG. 25.

FIG. 26 is a diagram for explaining the operation of the arrangement in FIG. 25. The data set in the register 1020 is shown at (B). The data (B) is applied to a comparator 1024. A counter 1022 is a free-run counter, which receives fixed clocks from a clock terminal 1028 and which supplies the comparator 1024 with a count value indicated at (A) in FIG. 26. The comparator 1024 provides "0" in the state in which the output of the counter 1022 has a digital value greater than that of the register 1020, and it provides "1" in the reverse state. Accordingly, an output from the comparator 1024 to a flip-flop 1026 becomes a waveform shown at (C) in FIG. 26. The waveform C is input to AND gates 1036, 1038 and 1040. The AND gates receive signals R, G and B indicative of red, green and blue from the color decoder in FIG. 13, FIG. 15 or FIG. 17, and deliver pulses to switching circuits in accordance with the AND conditions of the waveform C with these signals. When the data (B) in FIG. 26 enlarges, the duty factor of the pulse (C) increases, and vicer versa. The brightness of the liquid crystal is determined by the pulse duration (pulse duty factor) of the pulse (C). As the duty factor of the pulse (C) becomes larger, the brightness rises (the liquid crystal becomes brighter).

Accordingly, pulse durations suited to the respective colors are obtained in such a way that duty factors corresponding to the respective colors are held in the pulse duration holding circuits 1004 thru 1018 beforehand.

The pulse duration holding circuits are constructed of a circuit such as ROM memory, and have digital values held in advance.

Meanwhile, even when data is input from the CPU to the register 1020 on each occasion without using the decoder and the pulse duration holding circuits, a similar effect is attained.

In this case, simultaneously with the setting of the color data in the color register as described before, a pulse duration corresponding to this color data is read out of the table of a ROM storing pulse durations in advance and is set in the register 1020. Thus, the similar effect is achieved.

Further, a pulse duration corresponding to a display state can be set in the register 1020 in order to perform a brightness control at need. When the important display of, for example, overheat or fuel running-out, the pulse duration can be lengthened and set in order to raise the brightness.

According to this embodiment, the brightness can be properly adjusted in the color control of a pattern, and a pattern easy to see can be displayed.

The present invention is applied to a liquid crystal cell which forms the display portions of an instrument panel for an automobile. That is, the color scheme of unselected segment electrodes among segment electrodes S1, S2, S3, S4 ... in each display portion is set at the same system as that of the color scheme of the area of a diffuser or a liquid crystal cell panel except the areas of the segment electrodes.

We claim:
1. A liquid crystal display device provided with a plurality of transparent segment electrodes each having at least one color filter thereon, desired ones of the segment electrodes being selected for display; characterized in that an area of a display surface of said liquid crystal display device except areas of said segment electrodes is formed so as to present a color similar to a color presented by the segment electrodes in an unselected state.

2. A liquid crystal display device according to claim 1, wherein said each segment electrode is constructed of a plurality of transparent electrode stripes, on which the plurality of color filters transmitting different colors are arranged in a predetermined order of the colors.

3. A liquid crystal display device according to claim 1, wherein a diffuser is attached behind a liquid crystal cell, and the area of said diffuser except the areas of said segment electrodes is coated so as to present the color similar to the color presented by said segment electrodes in the unselected state.

4. A liquid crystal display device according to claim 1, wherein the area of a front surface of a display panel except the areas of said segment electrodes is coated so as to present the color similar to the color presented by said segment electrodes in the unselected state.

5. A liquid crystal display device according to claim 2, wherein among said plurality of stripes constituting said each segment electrode, ones for displaying the colors different from each other are respectively driven by rectangular waves which have duty factors different from each other as previously determined for the different colors.

* * * * *